US006480693B2

(12) United States Patent
Liston et al.

(10) Patent No.: US 6,480,693 B2
(45) Date of Patent: Nov. 12, 2002

(54) METHOD AND APPARATUS FOR CORRECTING REGISTRATION FAULTS BASED ON CHANGES IN MACHINE STATE IN A MULTICOLOR PRINTING MACHINE

(75) Inventors: Christopher Liston, Rochester, NY (US); Patrick Metzler, Gettorf (DE)

(73) Assignee: NexPress Solutions LLC, Rochester, NY (US)

( * ) Notice: Subject to any disclaimer, the term of this patent is extended or adjusted under 35 U.S.C. 154(b) by 0 days.

(21) Appl. No.: 09/858,431

(22) Filed: May 16, 2001

(65) Prior Publication Data

US 2001/0055506 A1 Dec. 27, 2001

Related U.S. Application Data

(60) Provisional application No. 60/204,691, filed on May 17, 2000.

(51) Int. Cl.$^7$ .............................................. G03G 15/00
(52) U.S. Cl. ........................................ 399/301; 399/44
(58) Field of Search ................................ 399/301, 299, 399/44, 39, 40, 94, 97, 306

(56) References Cited

U.S. PATENT DOCUMENTS

| 5,579,092 | A | * | 11/1996 | Isobe et al. | 399/39 |
| 5,867,759 | A | * | 2/1999 | Isobe et al. | 399/301 |
| 5,907,741 | A | * | 5/1999 | Matsuzawa et al. | 399/44 |
| 6,148,159 | A | * | 11/2000 | Shiraishi | 399/44 |

* cited by examiner

Primary Examiner—Quana M. Grainger
(74) Attorney, Agent, or Firm—Lawrence P. Kessler

(57) ABSTRACT

Apparatus and a method for correcting registration faults based on changes in machine state (4, 4', . . . ; 5, 5', . . .) in a multicolor printing machine (1) having a number of printing units (13, 13', . . .) with image cylinders (14, 14', . . .) and exposure devices (2, 2', . . .) for the digital production of color separations (3, 3', . . .) on the image cylinders (14, 14', . . .), the actions of setting up and combining the color separations (3, 3', . . .) being controlled such that in-register prints are achieved. Changes in machine state (4, 4', . . . ; 5, 5', . . .) are registered and, on the basis of these changes in machine state (4, 4', . . . ; 5, 5', . . .), the production of the color separations (3, 3', . . .) is changed such that a disturbance to registration accuracy of the print, threatened by a change in machine state (4, 4', . . . ; 5, 5', . . .), is compensated for.

10 Claims, 1 Drawing Sheet

METHOD AND APPARATUS FOR CORRECTING REGISTRATION FAULTS BASED ON CHANGES IN MACHINE STATE IN A MULTICOLOR PRINTING MACHINE

CROSS REFERENCE TO RELATED APPLICATION

Reference is made to and priority claimed from U.S. Provisional Application Ser. No. 60/204,691, filed May 17, 2000, entitled METHOD AND APPARATUS FOR CORRECTING REGISTER FAULTS BASED ON CHANGES IN MACHINE STATE IN A MULTICOLOR PRINTING MACHINE.

FIELD OF THE INVENTION

The invention relates to a method and apparatus for correcting registration faults based on changes in machine state in a multicolor printing machine having a number of printing units with image cylinders and exposure devices for the digital production of color separations on the image cylinders, the actions of setting up and combining the color separations being controlled such that in-register prints are achieved.

The invention also relate to an apparatus for implementing the method with a multicolor printing machine having a number of printing units with image cylinders and equipment for the digital production of color separations on the image cylinders, and at least one controller to achieve in-register prints, the actions of producing and combining the color separations being controlled.

BACKGROUND OF THE INVENTION

Printing colored illustrations, in particular color images, is carried out by a number of color separations being printed over one another. These are generally the colors yellow, magenta and cyan as well as black. If required, special colors are added. By overprinting these colors, all color combinations can be achieved, the quality of the prints depending significantly on the in-register overprinting of the color separations. In the case of digital printing processes, for example, electrostatic printing processes, the maintenance of the registration of the overprint is achieved by the image production equipment being controlled such that the color separations meet one another in-register when they are transferred to a printing substrate.

A method and apparatus of a printing machine are disclosed by U.S. Pat. No. 5,715,498. There, the correction of registration faults by the print and the registration of registration marks is proposed. Registration faults are often caused by changes in machine state. For example, temperature changes lead to dimensional changes, in particular with respect to the distance between the individual printing units or between the bearings of various cylinders. The disadvantage of this technical solution is that, in the event of changes in machine state, counteractive control is always only possible for the next print, since the effect of a change in machine state is only registered when it has already caused a registration fault. As a result, test prints are necessary and time is lost, which in the case of small jobs is often uneconomic and, therefore, not acceptable.

SUMMARY OF THE INVENTION

The invention is, therefore, based on the object, in a method and apparatus for printing, of preventing the occurrence of registration faults as a result of dimensional changes, in particular between the printing units or between mountings of various cylinders, to the largest possible extent from the start.

According to the invention the object is achieved by changes in machine state being registered and, on the basis of these changes in machine state, the production of the color separations being changed in such that a disturbance to the registration accuracy of the print, threatened by a change in machine state, is compensated for.

The advantage of the invention is that many changes, which influence registration, are counteracted without any delay. In this way, an influence of a change in machine state can be counteracted very quickly such that test prints and/or registration marks are generally not necessary. It is precisely in the case of small jobs that this is of economic importance, since machine time and often also printing substrates can be saved.

However, it is, of course, possible for the measure according to the invention to be further combined with further registration detection systems, control systems and regulating systems, in order to achieve monitoring and, if necessary, more exact correction, in particular in the case of further fault causes. In this case, the advantage according to the invention, that significant fault causes can be compensated for without any delay, is still maintained, and faults are avoided or at least considerably reduced. Reject prints can be avoided to the greatest possible extent in this way, and no other time-consuming control or regulating operations are needed either in order to achieve usable prints.

By the invention, various types of changes in machine state can be registered and taken into account. The aim is to register those changes in machine state, which have an influence on registration. These are primarily dimensional changes, in particular between the individual printing units, but also between the mountings of various cylinders, such as between image cylinders and image transfer cylinders. Such changes in spacing are caused by temperature changes and/or changes in mechanical stresses.

It is possible that the temperature of the multicolor printing machine is registered at at least one location. Further possibilities are to register the mechanical stress or a change in spacing in the multicolor printing machine. Measurements are expediently made at a number of locations, the measurement locations being placed such that the changes in machine state are registered at the locations at which they exert an influence on the registration, which is critical for the print quality, such as the spacing between the individual printing units. With respect to the apparatus, it is then proposed that at least one temperature sensor, at least one sensor for measuring mechanical stresses and/or at least one sensor for registering dimensional changes be provided.

For the compensation of the threatened disturbance to registration accuracy, there are various possibilities. One proposal is that a change in machine state be registered and a disturbance to the registration accuracy of the print, threatened thereby, be countered by a controlled change in the production of the color separations, and then the registration be regulated on the basis of registration of the printed result. In this case, counteractive control precedes the regulation, in order to minimize the magnitude of the threatened registration fault from the start. Another possibility is for a change in machine state to be registered quantitatively and a disturbance to registration accuracy of the print, threatened thereby, to be compensated for, on the basis of the change in machine state, by stored values based on experience, which are assigned to the quantitative change in machine state.

With respect to the apparatus of this invention, it is proposed that a controller be provided that in the event of a change in machine state counters a disturbance to registration accuracy of the print, threatened thereby, by a controlled change in the production of the color separations, and then regulates the same on the basis of registering the printed result. When registering the printed result, a print itself, for example, the start of the print, can be registered, or it is possible that a sensor for detecting registration marks is arranged in order to register the printed result. Registration marks can be printed on the carrier for printing substrates or on an image-free edge of a printing substrate, for example, on a test sheet. For the other alternative with respect to compensating for the threatened disturbance to registration accuracy, it is proposed that at least one sensor be provided for the quantitative registration of changes in machine state, and at least one controller be provided that it effects compensation for a disturbance, threatened thereby, to registration accuracy of the print by performing the control on the basis of stored values based on experience, which are assigned to the quantitative changes in machine state.

Of course, the measure according to the invention does not rule out the combination with a conventional registration regulating system; it is generally an extension to such, in order to counteract effects of a change before they manifest themselves in registration faults. Provision can, therefore, be made for a controller to be provided in addition to the registration of registration marks by a sensor or another registration regulating system or control system. However, if other fault causes are few, then the registration regulating system according to the invention can also on its own lead to the target of high registration accuracy.

The invention, and its objects and advantages, will become more apparent in the detailed description of the preferred embodiment presented below.

BRIEF DESCRIPTION OF THE DRAWING

The invention will be explained below using an exemplary embodiment illustrated schematically in the FIGURE.

DETAILED DESCRIPTION OF THE INVENTION

Figure 1:
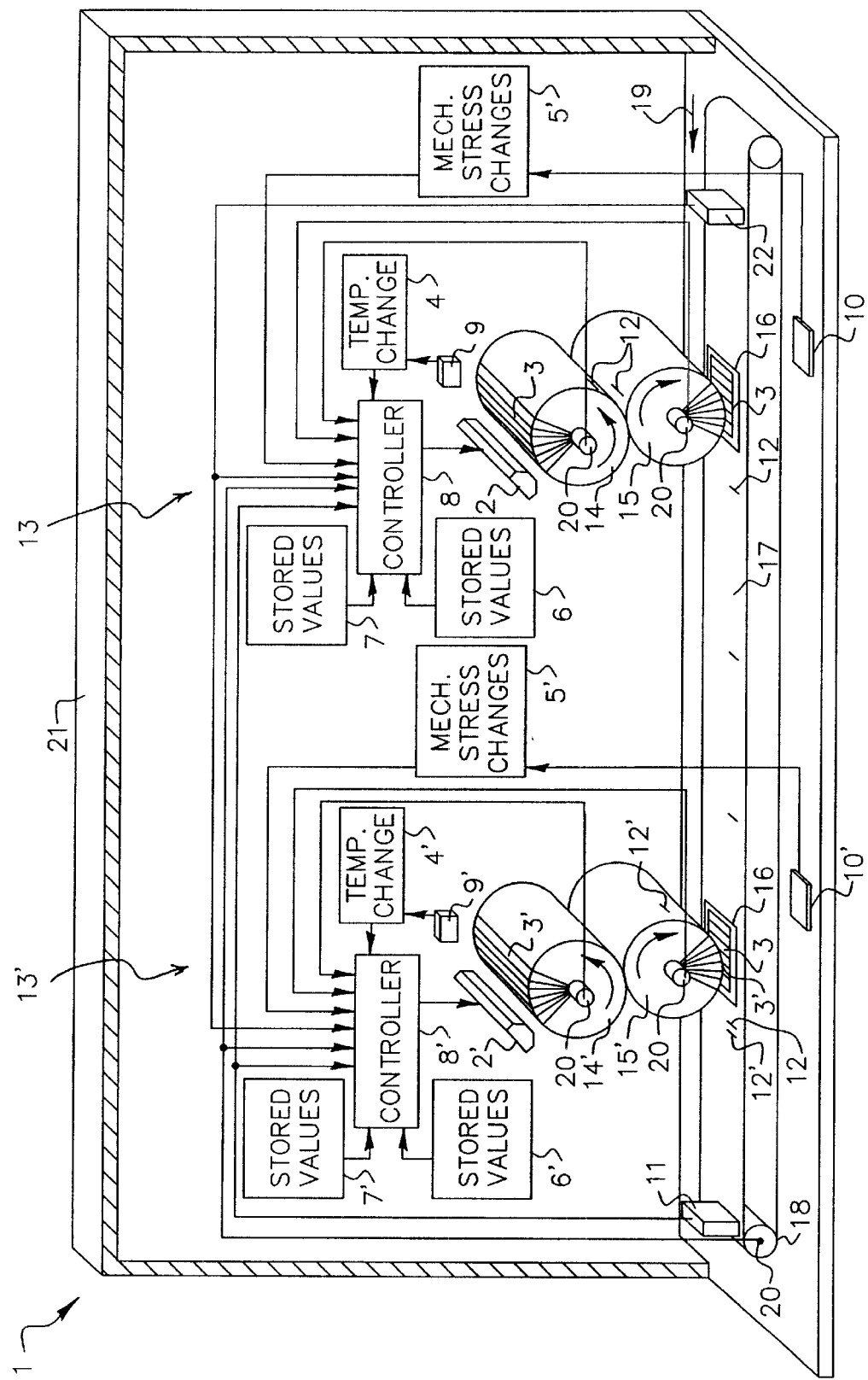

The FIGURE shows a multicolor printing machine 1, housing 21 thereof being illustrated as partly cut open. The printing machine illustrated has two printing units 13 and 13', this illustration with two printing units having been selected for purposes of simplification. Normally, printing machines have four or more printing units 13, 13', . . . . These have to be imagined as being added to the illustration in the FIGURE.

The multicolor printing machine 1 has exposure devices 2, 2', for the digital production of color separations 3, 3'. . .. The color separations are applied in digital form to image cylinders 14, 14',. . .. From the image cylinders 14, 14', . . . , they are transferred to image transfer cylinders 15, 15', . . . , and from there to printing substrates 16. The printing substrates 16 are led through the printing machine by a carrier 17. The carrier 17 is driven by a drive roller 18 and transports the printing substrates 16 in the direction of the arrow 19.

Since the color separations 3, 3', . . . have to arrive on the printing substrates 16 in the correct position, that is to say in-register, a controller 8, 8', . . . is provided, which controls the positional relationships of the color separations 3, 3', . . . to one another and to the printing substrates 16. For this purpose, the positions of the image cylinders 14, 14', . . . , of the image transfer cylinders 15, 15', . . . , and of the carrier 17 are registered. Sensors are provided for this purpose, for example, rotary encoders 20. By information from the sensors, the controller 8, 8', . . . receives the data relating to the positions of the aforementioned elements of the printing machine, which carry the image and substrate. For the purpose of allocation to a printing substrate 16, use is made of a sensor 22 for registering printing substrates 16, which is arranged at the beginning of the carrier 17. This illustration is merely an example of a registration control system. The invention may also be combined with other types of registration control systems, for example, one in which the production of the color separations 3, 3', . . . is controlled by registering the time or position of registration marks 12, 12', . . .. In this case, these registration marks 12, 12', . . . are printed by the printing units 13, 13', . . . and registered by a sensor 11.

With this invention, machine state changes 4, 4', . . . ; 5, 5', . . . are registered as early as possible, and a disturbance to the registration accuracy of the print, threatened by such a machine state change 4, 4', . . . ; 5, 5', . . . is counteracted immediately, before the machine state change 4, 4', . . . ; 5, 5 , . . . has an effect on the print quality. For this purpose, temperature sensors 9, 9', . . . and stress sensors (sensors for measuring mechanical stresses) 10, 10', . . . are provided. Temperature changes and the changes in mechanical stresses in the printing machine 1 are, therefore, registered immediately, and counteractive control is immediately provided, which prevents threatened disturbances to registration accuracy or at least counteracts such disturbances as early as possible.

For this purpose, the temperature sensors 9, 9', . . . provide data about the machine state (temperature) changes 4, 4', . . . , and the stress sensors 10, 10', . . . provide data about the machine state (mechanical stress) changes 5, 5', . . . immediately to controllers 8, 8', . . .. The controllers can then immediately initiate changes in the production of the color separations 3, 3', . . . , these changes being such that they are opposed to threatened disruptions to registration accuracy.

It is particularly expedient if the temperature changes 4, 4', . . . and the mechanical stress changes 5, 5', . . . are registered quantitatively, and the change to the production of color separations 3, 3', . . . by the controllers 8, 8', . . . and by the exposure devices 2, 2', . . . is carried out on the basis of stored values 6, 6', . . . . The stored values 6, 6', . . . are based on experience and assigned to temperatures. Or the change to the production of color separations 3, 3', . . . by the controllers 8, 8', . . . may be carried out by stored values 7, 7', . . . which are based on experience and are assigned to mechanical stresses. However, any other type of compensation is, of course, likewise possible, for example, the registration of the direction of the threatened disturbance and counteractive control corresponding to this direction, it then being necessary for the result to be registered, for example, by registration marks 12, 12', . . . , and a control loop leading the correction to the end on the basis of the result.

In order to register the result of the correction, a sensor 11 for detecting registration marks 12, 12', . . . is also provided. These registration marks 12, 12', . . . are simultaneously printed by the printing units 13, 13', . . . , it being possible for them to be printed on the carrier 17, on a test sheet, or on the print-free edge of a substrate 16. The sensor 11 registers the position of the registration marks 12, 12', . . . and, likewise, provides this data to the controllers 8, 8', . . . in order that the controllers can check registration regulation according to the invention and, if necessary, correct it, which is particularly advantageous if still further fault causes are added. For this case, however, the invention leads to a considerable reduction in the magnitude of faults, as a result of which registration accuracy is often still within the tolerable range.

The illustration concerns one exemplary embodiment of a printing machine. Of course, this can also be constructed differently, for example, can have four image cylinders 14, 14', . . . , which transfer the color separations 3, 3', . . . directly to the printing substrates 16.

The invention has been described in detail with particular reference to certain preferred embodiment thereof, but it will be understood that variations and modifications can be effected within the spirit and scope of the invention.

| Parts List | |
|---|---|
| 1 | Multicolor printing machine |
| 2, 2', . . . | Exposure devices for the digital production of color separations |
| 3, 3', . . . | Color separations |
| 4, 4', . . . | Changes in machine state, here temperature changes |
| 5, 5', . . . | Changes in machine state, here changes in the mechanical stress |
| 6, 6', . . . | Stored values based on experience - assigned to temperatures |
| 7, 7', . . . | Stored values based on experience - assigned to mechanical stresses |
| 8, 8', . . . | Controller for achieving in-register prints |
| 9, 9', . . . | Temperature sensor |
| 10, 10', . . . | Stress sensor (sensor for measuring mechanical stresses) |
| 11 | Sensor for detecting registration marks |
| 12, 12', . . . | Registration marks |
| 13, 13', . . . | Printing units |
| 14, 14', . . . | Image cylinders |
| 15, 15', . . . | Image transfer cylinders |
| 16 | Printing substrate |
| 17 | Carrier for printing substrates |
| 18 | Drive roller |
| 19 | Arrow: transport direction |
| 20 | Rotary encoder |
| 21 | Housing |
| 22 | Sensor for registering printing substrates |

What is claimed is:

1. A method of correcting registration faults based on changes in machine state (4, 4'; 5, 5') in a multicolor printing machine (1) having a number of printing units (13, 13') with image cylinders (14, 14') and exposure devices (2, 2') for the digital production of color separations (3, 3') on the image cylinders (14, 14'), the actions of setting up and combining color separations (3, 3') being controlled such that in-register prints are achieved, wherein: changes in machine state (4, 4'; 5, 5') are registered, one of the changes in machine state is temperature, and one of the changes in machine state is mechanical stress, and a mechanical stress in the multicolor printing machine (1) is registered at at least one location; and, on the basis of these changes in machine state (4, 4'; 5, 5'), the production of color separations (3, 3') is changed such that a disturbance to the registration accuracy of a print, threatened by a change in machine state (4, 4'; 5, 5'), is compensated for.

2. The method as claimed in Claim 1, wherein one of the changes in machine state is dimensional changes, and dimensional changes in the multicolor printing machine (1) are registered at at least one location.

3. The method as claimed in Claim 1, wherein a change in machine state (4, 4'; 5, 5') is registered, and a disturbance to registration accuracy of the print, threatened thereby, is countered by a controlled change in the production of the color separations (3, 3'), and then registration is regulated on the basis of registering the printed result.

4. The method as claimed in Claim 1, wherein a change in machine state (4, 4'; 5, 5') is registered quantitatively, and a disturbance to registration accuracy of the print, threatened thereby, is compensated for, on the basis of said change in machine state (4, 4'; 5, 5'), by stored values (6, 6'; 7, 7') based on experience, which are assigned to the quantitative change in the machine state (4, 4', 5, 5').

5. Apparatus for a multicolor printing machine (1) having a number of printing units (13, 13') with image cylinders (14, 14') and exposure devices (2, 2') for the digital production of color separations (3, 3') on the image cylinders (14, 14'), and at least one controller (8, 8') for achieving in-register prints, the actions of producing and combining color separations (3, 3') being controlled by said at least one controller (8, 8'), wherein: at least one sensor (9, 9'; 10, 10') is provided to register changes in machine state (4, 4'; 5, 5'), said at least on sensor (9, 9') is a temperature sensor arranged in the multicolor printing machine (1); and said at least one sensor (10, 10') is a sensor for measuring mechanical stresses arranged in the multicolor printing machine (1), and said at least one controller (8, 8') is such that it changes the production of color separations (3, 3') such that the disturbances to the registration accuracy of a print, threatened by changes in machine state (4, 4'; 5, 5'), are compensated for.

6. The apparatus as claimed in Claim 5, wherein said at least one sensor is a sensor for registering dimensional changes arranged in the multicolor printing machine (1).

7. The apparatus as claimed in Claim 5, wherein said controller (8, 8') is such that, in the event of a change in machine state (4, 4'; 5, 5'), it counters a disturbance to registration accuracy of the print, threatened thereby, by a controlled change in the production of color separations (3, 3'), and then regulates the same on the basis of registering the printed result.

8. (Once Amended) The apparatus as claimed in Claim 7, wherein in order to register the printed result, a sensor (11) is arranged to detect registration marks (12, 12').

9. (Once Amended) The apparatus as claimed in Claim 5, wherein said at least one sensor (9, 9'; 10, 10') is provided for the quantitative registration of changes in machine state (4, 4'; 5, 5'), and said at least one controller (8, 8') is such that it effects compensation for a disturbance, threatened thereby, to the registration accuracy of a print, by performing control on the basis of stored values (6, 6'; 7, 7') based on experience, which are assigned to the quantitative changes in the machine state (4, 4'; 5, 5').

10. The apparatus as claimed in Claim 9, further including a sensor (11) for registration of registration marks (12, 12'), wherein said at least one controller (8, 8') additionally makes corrections to the control of the production of color separations (3, 3') on the basis of the registration of registration marks (12, 12') by said sensor (11).

* * * * *